Dec. 5, 1961   R. M. CARRIER, JR   3,011,355
VIBRATION EXCITER EMPLOYING A LIQUID MASS
Filed April 29, 1957   4 Sheets-Sheet 1
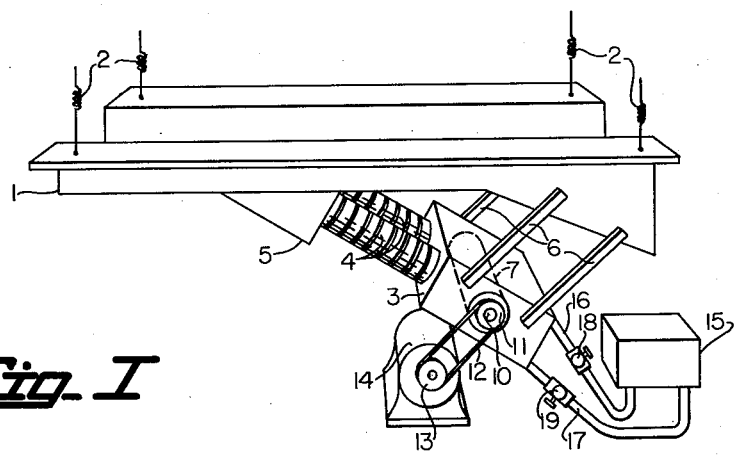
Fig. I
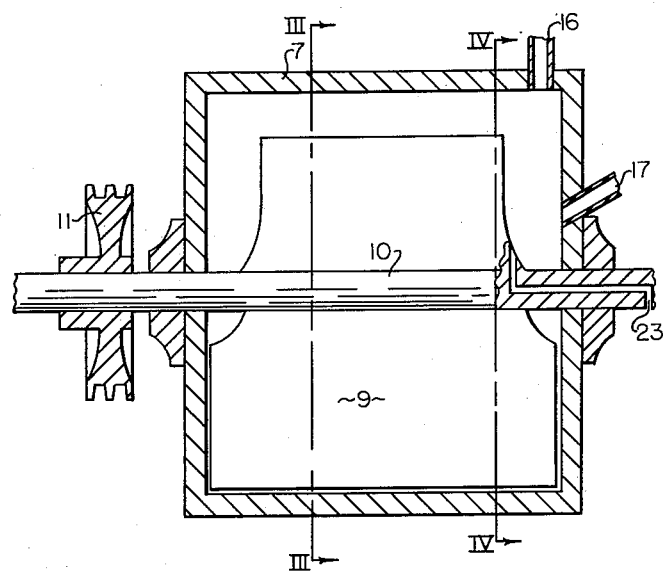
Fig. II
INVENTOR.
ROBERT M. CARRIER JR.
BY
Marshall, Marshall & Yeasting
ATTORNEYS Dec. 5, 1961  R. M. CARRIER, JR  3,011,355
VIBRATION EXCITER EMPLOYING A LIQUID MASS
Filed April 29, 1957  4 Sheets-Sheet 2
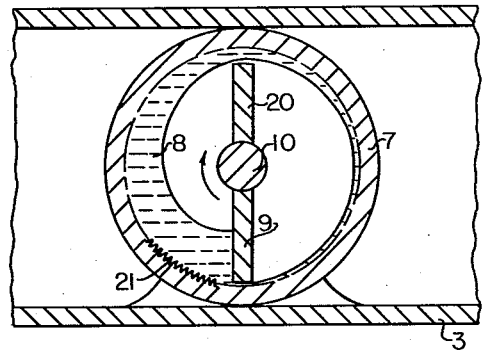
_Fig. III_
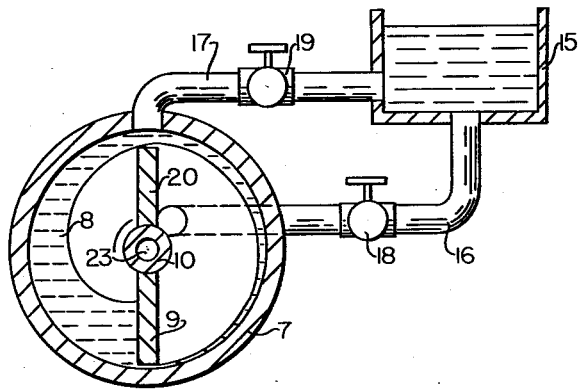
_Fig. IV_
INVENTOR.
ROBERT M. CARRIER JR.
BY
ATTORNEYS

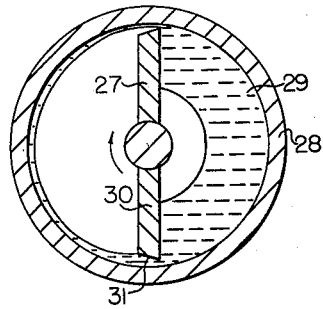
Fig. V
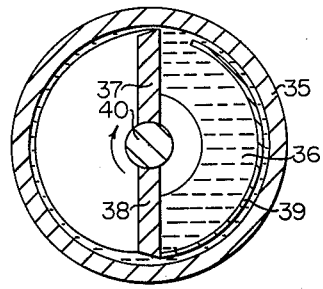
Fig. VI
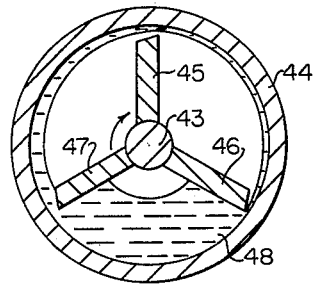
Fig. VII

Dec. 5, 1961    R. M. CARRIER, JR    3,011,355
VIBRATION EXCITER EMPLOYING A LIQUID MASS
Filed April 29, 1957    4 Sheets-Sheet 4
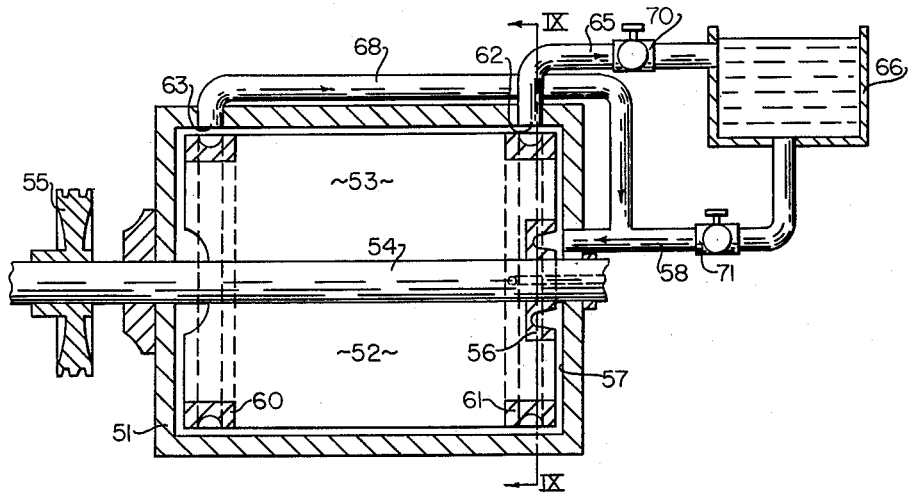
*Fig. VIII*
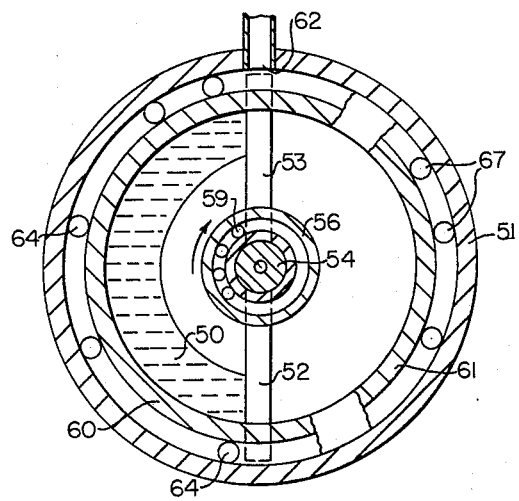
*Fig. IX*
INVENTOR.
ROBERT M. CARRIER JR.
BY
Marshall, Marshall & Yeasting
ATTORNEYS

United States Patent Office 3,011,355
Patented Dec. 5, 1961

3,011,355
VIBRATION EXCITER EMPLOYING A LIQUID MASS
Robert M. Carrier, Jr., Louisville, Ky., assignor, by mesne assignments, to Chain Belt Company, Milwaukee, Wis., a corporation of Wisconsin
Filed Apr. 29, 1957, Ser. No. 655,580
3 Claims. (Cl. 74—87)

This invention relates to vibration exciters using rotating eccentric weights and in particular to a structure in which the eccentric weight comprises a body of liquid that is driven around the inner periphery of a cylindrical container fixed in a member to be vibrated.

The use of rotating eccentric weights for the generation of vibration in apparatus that performs work by vibration is well known. Customarily these weights are solid masses eccentrically mounted on drive pulleys or a separate hub mounted on a rotating shaft. The centrifugal force resulting from the rotation of these eccentric weights transmits vibratory force through the shaft bearings to the member in which the shaft is journaled and thus produces vibration of such member.

The transmission of vibratory force from the shaft through the bearings to the member that is to be vibrated is acceptable as long as the amount of force to be transmitted is comparatively small. However, in large machines in which the member to be vibrated may weigh thousands of pounds this method of transmitting vibratory force is unsatisfactory because of the high loading and resulting short life of the bearings.

The principal object of this invention is to provide an eccentric weight vibration generating mechanism that does not transmit the vibratory force through the rotating bearings but rather generates the force directly against a solid portion of the member to be vibrated.

Another object of the invention is to provide vibration generating equipment that may be operated at constant speed and variable amplitude with the amplitude easily controlled from a station exterior of the machine.

Another object of the invention is to provide vibration generating equipment in which a body of liquid that is forced to flow in a generally circular path is employed as the eccentric weight and the force is transmitted directly through the wall of the container to the member to be vibrated.

These and more specific objects and advantages are attained in a vibration exciter constructed according to the invention.

According to the invention the improved vibration generator comprises a cylindrical shell or container in which a body of liquid is confined and caused to flow about its inner periphery. A shaft extending axially through the container carries a pair of vanes at least one of which is adapted to drive the body of liquid. Means are provided in some examples to cause the liquid to tend to accumulate in a chamber comprising the space immediately ahead of the driving vane so that all of the mass of liquid is available for generating vibratory force. The invention further contemplates the use of pressures developed by the rotating liquid to cause it to flow through connecting conduits to or from a reservoir so that the quantity of liquid in the container and effective for generating vibration may be varied to control the amplitude of vibration.

Preferred forms of the invention are illustrated in the accompanying drawings.

In the drawings:
FIGURE I is a simplified side view in perspective of a conveyor equipped with an exciting mass or member and springs forming a vibratory system.
FIGURE II is a section through the exciter member.
FIGURE III is a cross sectional view as seen on the line III—III of FIGURE II.
FIGURE IV is a schematic hydraulic diagram illustrating a method of varying the quantity of liquid in the vibration exciter and using the pressures developed in such exciter for causing flow of the liquid.
FIGURE V shows another form of the invention in which the edges of the vanes of the drive shaft are shaped to cooperate with the cylindrical wall of the container to accumulate the body of liquid in the chamber to one side of the pair of vanes leaving the other chamber practically empty.
FIGURE VI shows an alternative form of the vibration exciter in which a thin membrane or flexible member is employed to assist in accumulating the liquid in one of the chambers.
FIGURE VII is similar to FIGURE V except that three vanes are employed so that the liquid accumulates in a chamber occupying substantially less than half the volume of the cylindrical container.
FIGURE VIII shows still another form of the invention and in particular means for controlling the flow of liquid to and from the cylindrical container.
FIGURE IX is a sectional view as seen from the line IX—IX of FIGURE VIII.

These specific figures and the accompanying description are intended merely to illustrate the invention but not to impose limitations on its scope.

Referring to FIGURE I a conveyor trough 1 which may be of very heavy construction for handling heavy castings in a foundry or in a mine for sorting ore or other heavy material is suspended from a plurality of resilient supports 2 so it may be vibrated through substantial amplitudes without transmitting substantial vibration to the support or framework of the building or other structure in which the conveyor is supported. The conveyor 1 is maintained in vibration by the reaction force of a vibration exciter or impulse member 3, which force is transmitted through coupling springs 4 to a spring mounting block 5 attached to the conveyor 1. A plurality of laterally flexible struts 6 connecting the exciter 3 to the conveyor 1 guide the exciter 3 along a path generally parallel to the desired vibratory motion of the conveyor 1. The vibration exciter 3 includes a cylindrical container 7 that serves as a housing for a body of liquid 8 constituting the eccentric weight or eccentric mass that produces the vibratory force. The liquid is kept in motion in a circular path around the inner periphery of the container 7 by impeller vane 9 (FIGURES II and III) extending radially from a shaft 10 extending axially through the container 7 and fitted with a pulley 11 that is connected through a belt 12 to a pulley 13 of a motor 14.

A reservoir 15 which may be built integrally with the impulse member 3 or as a separate unit is connected through conduit means 16 and 17 to the cylindrical container 7 of the vibration exciter 3. Valves 18 and 19 are provided in the conduit leads to regulate the flow of liquid to and from the reservoir 15.

In a vibration exciter of this general type the unbalanced force of the rotating eccentric weight, the liquid 8 in the container 7 in this case, produces vibratory force exerted in the exciter or impulse member 3 causing it to vibrate along a generally linear path defined by the laterally resilient struts 6. The springs 4 coupling the impulse member 3 to the conveyor 1 are selected so that they cooperate with the impulse member 3 to form a vibratory system having a natural frequency. The shaft 10 and consequently the eccentric body of liquid 8 within the container 7 is driven at a rotational speed corresponding to such resonant frequency to produce a relatively large amplitude of vibration of the impulse member or exciter 3.

The force exerted in the coupling spring 4 as a result of this resonant vibration is applied to the conveyor 1 and produces vibratory movement of the conveyor. Preferably the masses of the impulse member 3 and conveyor 1 are in the ratio of approximately 1:10 so that the amplitude of vibration of the impulse member is approximately ten times that of the conveyor deck 1. The actual amplitude of vibration varies with the magnitude of the vibratory force which in turn varies according to the quantity of liquid in the container 7. If a very small vibration is required most of the liquid is drained from the container 7 and stored in the reservoir 15 while if larger vibrations are required more of the liquid is retained in the container 7. The valves 18 and 19 permit the quantity of liquid to be adjusted while the apparatus is in operation.

Referring now to FIGURES II and III the impeller vane 9 extends along the shaft 10 and into close proximity to the inner periphery of the shell or container 7. The mass of the vane 9 is counterbalanced or dynamically balanced by a counterbalance vane 20 that extends diametrically opposite the impeller vane 9 but which is made considerably thicker and operates with considerably greater clearance with respect to the walls of the container. When the shaft 10 is turned by the pulley 11 the impeller vane 9 drives the mass of liquid in the shell or cylindrical container 7 ahead of it as indicated in FIGURE III. When the shaft 10 is turning at a uniform speed the liquid 8 tends to distribute itself about the periphery in a more or less uniform layer that gradually thickens from the trailing edge of the impeller vane 9 around the periphery to the leading edge. Since it is necessary for maximum efficiency of this type of apparatus that the liquid be confined to half the circumference of the chamber formed within the cylindrical shell 7 the inside of the shell is grooved with longitudinally extending cuts or teeth 21 that cause turbulence in the body of liquid thus increasing the friction between the cylindrical shell 7 and the liquid 8 so that it tends to pile up ahead of the impeller vane 9. Satisfactory operation is obtained when the body of liquid 8 takes the shape of a spiral having its greatest thickness ahead of the vane 9 and tapers down to a small thickness at the point approximately a half revolution ahead.

When this impeller vane 9 and the body of liquid 8 in the container is rotating the liquid is subject to centrifugal force and the pressure of the liquid on each incremental area of the cylindrical housing varies according to the speed of rotation and the radial depth of the liquid over that particular incremental area. The pressure in the liquid at the periphery of the cylinder just ahead of the vane is transmitted to the liquid between the tip of the vane and the periphery of the cylinder. This produces a force, similar to the buoyant force of a liquid on a floating body, urging the vane radially inward toward the axis. This force is resisted by the axle. To keep the radial forces on the axle as small as possible, this force is minimized by making the vane 9 as thin as possible consistent with the required stiffness and strength.

In one embodiment of the invention according to FIGURES I, II and III in which the cylindrical shell 7 had an inner diameter of eight inches the body of liquid 8, when operating at normal speed, varied from approximately an inch thick ahead of the vane 9 to less than one-quarter of an inch thick behind the vane. The vane 9 itself cleared the wall of the shell 7 by appropriately an eighth of an inch. When using a low viscosity oil as the liquid 8 and without the longitudinally extending grooves 21 the friction or retarding influence of the side walls on the body of liquid was not enough to prevent the liquid from assuming a nearly uniform thickness completely around the periphery thus minimizing the unbalance. However, the turbulence resulting from the grooves 21 was sufficient to retard the body of liquid and cause it to pile up ahead of the vane 9.

The quantity of liquid in the container 7 may be easily regulated when the device is in operation by allowing the liquid to flow either from or to the counter 7 through the conduit means connected to the reservoir 15. Thus if it is desired to reduce the amplitude of vibration the valve 19 is opened to allow the excess liquid to flow into the reservoir 15. If it is desired to increase the amplitude of vibration the valve 18 is opened while the valve 19 remains closed so as to permit liquid to flow from the reservoir 15 through the conduit 16 into the cylindrical shell 7 near its axis and then be picked up by the vane 9 and driven in the circular orbit.

In order to accommodate these changes in liquid volume in the fixed volume of the container 7 an air vent 23 is provided in the end of the shaft 10 leading from the atmosphere into the container near one of the vanes. Since this is at the axis or near the axis of rotation it is never immersed in liquid when the machine is operating.

The flow paths for the liquid are illustrated in FIGURE IV which is a section taken near the right hand end of FIGURE II to show the outlet conduit means 17 connected at the periphery of the cylindrical shell 7 so as to take advantage of the pressure developed in the liquid 8 by the centrifugal force resulting from its circular motion. Thus as soon as the valve 19 is opened the system operates like a vane centrifugal pump to force the liquid out of the container 7. When the valve 18 is opened the liquid flows by gravity into the cylindrical shell 7.

Other methods may be employed to urge the liquid to accumulate in the chamber immediately ahead of the impeller vane and thus get a maximum unbalance for a given amount of liquid and with little driving power. One such method is illustrated in FIGURE V. As shown in this figure an impeller vane 27 operating within a smooth cylindrical container 28 is arranged to drive a body of liquid 29 in a circular orbit around the inner wall of the cylindrical shell 28. The leading edge of the vane 27 is arranged to scrape or nearly scrape the oil or other liquid from the container wall and drive it ahead of the vane. An opposite or counterbalance vane 30 is also arranged to extend into close proximity to the cylindrical wall but its edge 31 is beveled so as to climb over and ride on the film of liquid like a sled runner on snow. The resulting wedge of oil or other liquid formed under the beveled edge 31 develops sufficient pressure at the trailing edge of the vane 30 to pump or otherwise force the liquid into the mass of liquid 29 even though there is an appreciable pressure difference in the liquid ahead of and behind the vane 30. In this arrangement the pumping action of the wedge or beveled edge 31 forces the liquid from the thin film into the body of liquid 29 faster than liquid can escape from that body past the edge of the vane 27 and into the otherwise empty chamber ahead of the counterbalance vane 30.

In order that this system shall operate satisfactorily it is necessary that the vanes 27 and 30 have appreciable thickness so as to provide substantial length for the passages past the edges of the vanes and that the clearances be kept quite small. It is also possible, at some expense in mechanical complexity, to provide sliding vanes in the edges of the main vanes 27 and 30 so as to automatically operate in close proximity or rubbing contact with the cylindrical wall of the container 28 and thus completely eliminate or minimize the leakage of liquid from the liquid body 29 past the vane 27. Likewise such a sliding vane in the edge of the counterbalance vane 30 can accommodate itself to the thickness of the liquid film ahead of the vane 30 and thus provide optimum pumping action at all times.

The principle of operation in this type of equipment is similar to the principle of a "Kingsbury" thrust bearing which operates on a wedge of lubricating oil in which the pressure in the oil is developed as oil is drawn into the wedge by relative motion of the bearing surfaces and varies from a very low pressure at the large end of the wedge to a very high pressure at the trailing or narrow edge of the wedge.

The principle of operation of the device shown in FIGURE V may be extended still further according to the structure shown in FIGURE VI. In this figure a cylindrical shell 35 serves as a container for a mass of liquid 36 that is driven in a circular orbit by a driving or impeller vane 37 and is confined by a counterbalance vane 38 and a thin flexible membrane 39 of sheet metal or other suitable material that is attached to the trailing edge of the counterbalance vane 38 and which extends or trails after such vane almost to the leading edge of the impeller vane 37. In this arrangement as the shaft 40 carrying the vanes 37 and 38 is rotated the edge of the impeller vane 37 acts as a scraper to drive the body of liquid 36. When the shaft 40 is rotated in the direction shown some of the liquid ahead of the counterbalance vane 38 enters the narrow channel formed between the flexible membrane 39 and the wall of the container 35 and, through contact with the wall flows at a slower rate than the movement of the membrane so that it rapidly lags behind the membrane 39 and is collected ahead of the impeller vane 37. As liquid collects in this space it goes into the chamber formed between the vanes 37 and 38 and membrane 39 so as to form a body of liquid pushing the membrane 39 outwardly toward the wall of the container 35. Metal to metal contact is not reached however because sufficient liquid is allowed to escape past the edge of the impeller vane 37 to form a film of appreciable thickness extending around the periphery of the container and ahead of the vane 38. This film traveling at a lesser velocity than the vanes 37 and 38 and flowing through the narrow channel between the membrane 39 and the container wall provides the pressure maintaining the liquid in the enclosed space.

FIGURE VII illustrates another version in which a plurality of vanes are employed, in this case three, some arranged with beveled edges one to act as a scraper and one as a wedge to accumulate the liquid in a chamber occupying considerably less than half the volume of the cylindrical container. In this particular arrangement a shaft 43 journaled in and extending axially through a cylindrical container 44 carries three vanes comprising a counterbalance vane 45, an impeller vane 46 and a wedge vane 47. A body of liquid in the cylindrical container 44 is urged by the wedge vane to accumulate as a mass 48 between the impeller vane 46 and wedge vane 47.

In each of the modifications shown in FIGURES V, VI and VII suitable conduit means may be employed in connection with a reservoir and valving to regulate the quantity of liquid in the cylindrical container and thus the magnitude of the unbalance forces exerted by such liquid as it is driven around its circular orbit in the container.

Another method of controlling the distribution of liquid within the exciter is illustrated in FIGURES VIII and IX. In this structure the body of liquid 50 is confined within a cylindrical shell 51 and is driven around a circular orbit by vane 52 and is held from flowing too far ahead by a balancing vane 53. The vanes are carried on a shaft 54 that extends axially through the container 51 and is provided at one end with a drive pulley 55. This much of the structure is similar to that shown in the previous examples. The additional structure includes a distributing ring 56 that provides a circular passage abutting an end wall 57 of the cylindrical container 51 to connect an inlet conduit 58 through openings 59 (FIGURE IX) to the space ahead of the impeller vane 52. Liquid flowing in this annular passage cannot escape to the space following the impeller vane 52 except as leakage past the edges of the distributing ring 56. A pair of circumferentially extending collector rings 60 and 61, mounted on the vanes 52 and 53, are grooved on their outer surfaces to register with outlet openings 62 and 63 in the upper portion of the cylindrical container 51. The collector ring 60 has openings 64 leading into the space ahead of the impeller vane 52, the chamber in which the liquid accumulates, so as to continually connect such chamber to an outlet conduit 65 by way of the opening 62. The other collector 61 has openings 67 opening into the space behind the impeller vane 52 so as to connect this chamber through the channel in the collector ring 61 and the other opening 63 through conduit 68 leading to and joining into the inlet conduit 58. Valves 70 and 71 are arranged in the conduits 65 and 58 respectively to control the flow of liquid from the cylindrical container 51 to or from a reservoir 66. In this arrangement any liquid within the cylindrical container 51 is driven around the periphery by the vanes 52 and 53 and the liquid in the space behind the impeller vane 52 and ahead of the balancing vane 53 flows by centrifugal force through the openings 67 into the collector ring 61 from which it is fed through the connecting conduit 65 and the inlet conduit 58 into the distributor ring 56 and thence into the chamber ahead of the impeller vane 52. Because of the pressure developed by the centrifugal force liquid flows from the outer surface of one chamber into the other. As long as this flow exceeds the leakage past the vanes the liquid accumulates in the latter chamber.

The quantity of liquid in the system is controlled by selective operation of valves 70 or 71. If it is desired to increase the amplitude of vibration which requires introducing a quantity of liquid into the exciter shell 51 the valve 71 is opened to allow liquid to flow from the reservoir 66 through distributor ring 56 into the chamber ahead of the impeller vane 52. This increases the quantity of liquid in such chamber and hence the unbalanced force resulting from the rotation of the shaft 54. Likewise when it is desired to decrease the amplitude of vibration the valve 70 is opened to permit liquid under pressure developed by the centrifugal force to flow through the collector ring 60 and conduit 65 into the reservoir 66. For steady state operation the valves 70 and 71 are both closed thus maintaining a fixed quantity of liquid trapped within the cylindrical container 61.

All of the preceding vibration structures are characterized by a common feature that they employ a mass of liquid driven in a circular path as the unbalanced mass and that the force developed by such liquid is exerted directly against the wall of the cylindrical container which is rigidly mounted in the exciter member. Thus there is no vibrational force transmitted through the bearings that journal the drive shafts 10, 40, 43 or 54. This feature is of particular importance in large heavy duty equipment where massive members must be vibrated and large forces are required.

Another feature common to the structure shown is the accumulation of liquid in a semicircle or less of the orbital path through which the liquid is driven so that maximum vibratory force is developed for a given amount of liquid.

Another common feature of importance is the means for permitting liquid to flow from the cylindrical container to a reservoir or from the reservoir back into the container using the impeller vanes driven by the shafts as pumping means to promote such flow of liquid. Thus the amplitude may be easily controlled or varied without the addition or necessity of employing other power driven equipment such as pumps or other structure to force the liquid from one container to the other.

In all forms of the invention the rotating mechanical structure is completely dynamically balanced except for the unbalance resulting from the introduction of liquid into the system. Thus when a liquid is drained from the cylindrical containers the systems run in complete or nearly complete balance so as to produce no vibratory force of material consequence. Thus these systems make available a complete range of amplitude control without varying the speed of the driving motor.

Various modifications may be made in the particular structure for confining the liquid in a predetermined portion of the cylindrical container during its motion in a circular orbit and for transmitting or transferring the liquid between a reservoir and the cylindrical shell according to the amplitude of vibration desired without departing from the scope of the invention.

Having described the invention, I claim:

1. A controllable vibration exciter comprising, in combination, a cylindrical container mounted on an object to be vibrated, a shaft extending along the axis of the cylindrical container, means for rotating the shaft, a generally thin flat vane fixedly mounted on and extending from the shaft with its edges in close proximity to the end walls and inner periphery of the cylindrical container, balancing means on the shaft to dynamically counterbalance the vane, a liquid mass in the container, said container having a plurality of axially extending grooves distributed over its inner periphery to oppose circumferential flow of the liquid mass and cause the liquid to continuously collect ahead of and rotate bodily with the vane, said grooves having a total volume that is small compared to the volume of the container, a liquid reservoir outside the container, a first conduit connecting the periphery of the container to the reservoir, a second conduit connecting an opening in the container adjacent the shaft to the reservoir, and valves in said conduits to interrupt the flow of liquid and thereby trap an adjustable quantity of fluid in the container, whereby the unbalanced force produced by rotation of the quantity of liquid collected ahead of the vane is adjusted.

2. A controllable vibration exciter comprising, in combination, a cylindrical container mounted on an object to be vibrated, a shaft extending along the axis of the cylindrical container, means for rotating the shaft, a generally thin flat vane mounted on and extending from the shaft to close proximity to the inner periphery and end walls of the container, means on the shaft for dynamically balancing the vane, a quantity of liquid forming a liquid mass contained in the cylindrical container and moving with the vane, and a plurality of grooves distributed over the inner periphery of the container adapted to continuously impede the flow of liquid such that the major portion of the liquid driven by the vane accumulates in the region immediately ahead of the vane.

3. A controllable vibration exciter comprising, in combination, a cylindrical container mounted on a member to be vibrated, a shaft extending axially through the container, means for rotating the shaft, a plurality of thin solid vanes fixed to and extending radially from the shaft one only of which serves as an impeller and extends into close proximity to the walls of the cylindrical container, the curved wall of said cylindrical container having a plurality of grooves roughening its surface to impede flow of liquid across the surface, a reservoir, conduit means connecting the reservoir to the container, said conduit means having a first branch opening into an end of the cylindrical container near the axis thereof and a second branch opening into the container at the curved periphery thereof, a body of liquid partially filling the reservoir and container, said liquid being continuously collected ahead of said one vane impeller by its resistance to flow across said grooved surface, and valving means for controlling the flow of liquid through the conduit means to vary the quantity of liquid in the container.

References Cited in the file of this patent

UNITED STATES PATENTS

| | | |
|---|---|---|
| 1,369,686 | Martel et al. | Feb. 22, 1921 |
| 2,596,281 | O'Brien | May 13, 1952 |
| 2,703,490 | Brueggeman et al. | Mar. 8, 1955 |
| 2,722,840 | Kececioglu | Nov. 8, 1955 |
| 2,771,860 | Falk | Nov. 27, 1956 |
| 2,791,182 | Scheidl | May 7, 1957 |
| 2,852,162 | Nauta | Sept. 16, 1958 |
| 2,877,644 | Beil et al. | Mar. 17, 1959 |

FOREIGN PATENTS

| | | |
|---|---|---|
| 64,467 | France | June 8, 1955 |
| | (1st add. to Patent 1,063,465) | |